Jan. 2, 1940. C. F. SCHMIDT 2,185,271
APPARATUS FOR ASSEMBLING GLASS APPLICATOR RODS AND BOTTLE CAPS
Filed Aug. 18, 1937 4 Sheets-Sheet 4
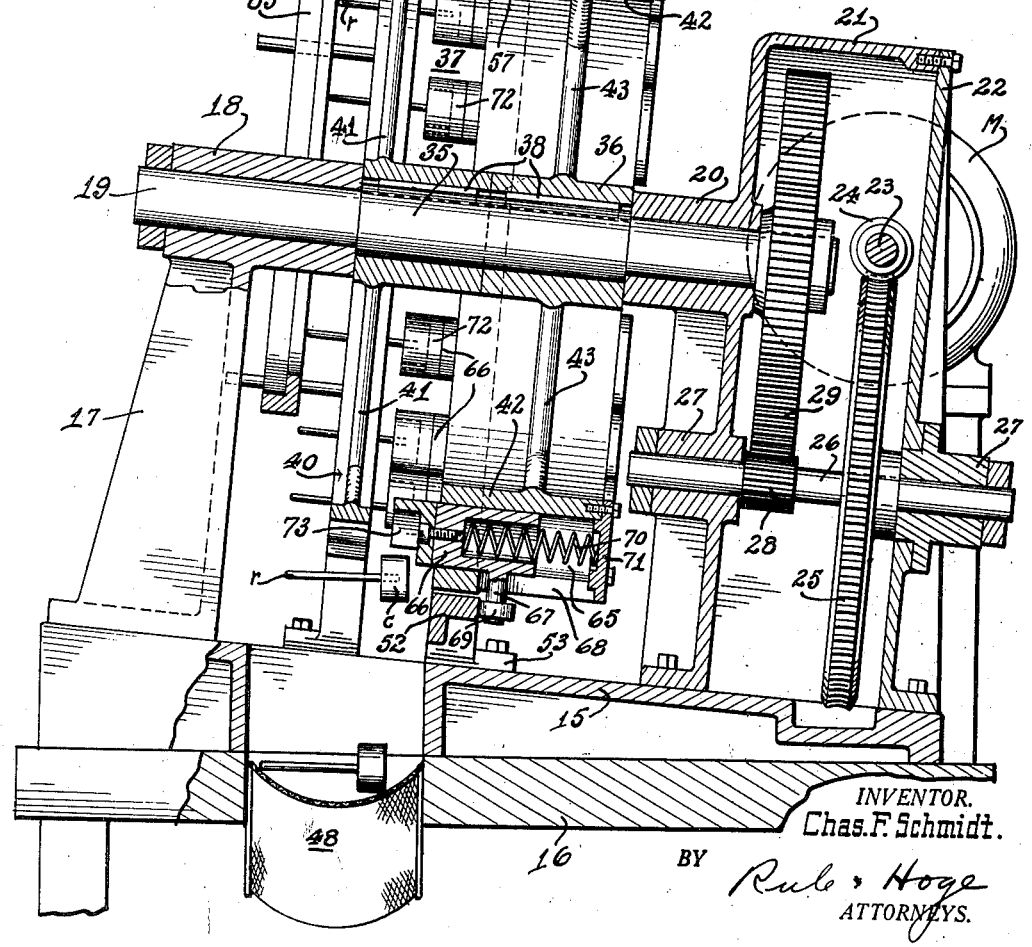
INVENTOR.
Chas. F. Schmidt.
BY Rule & Hoge
ATTORNEYS.

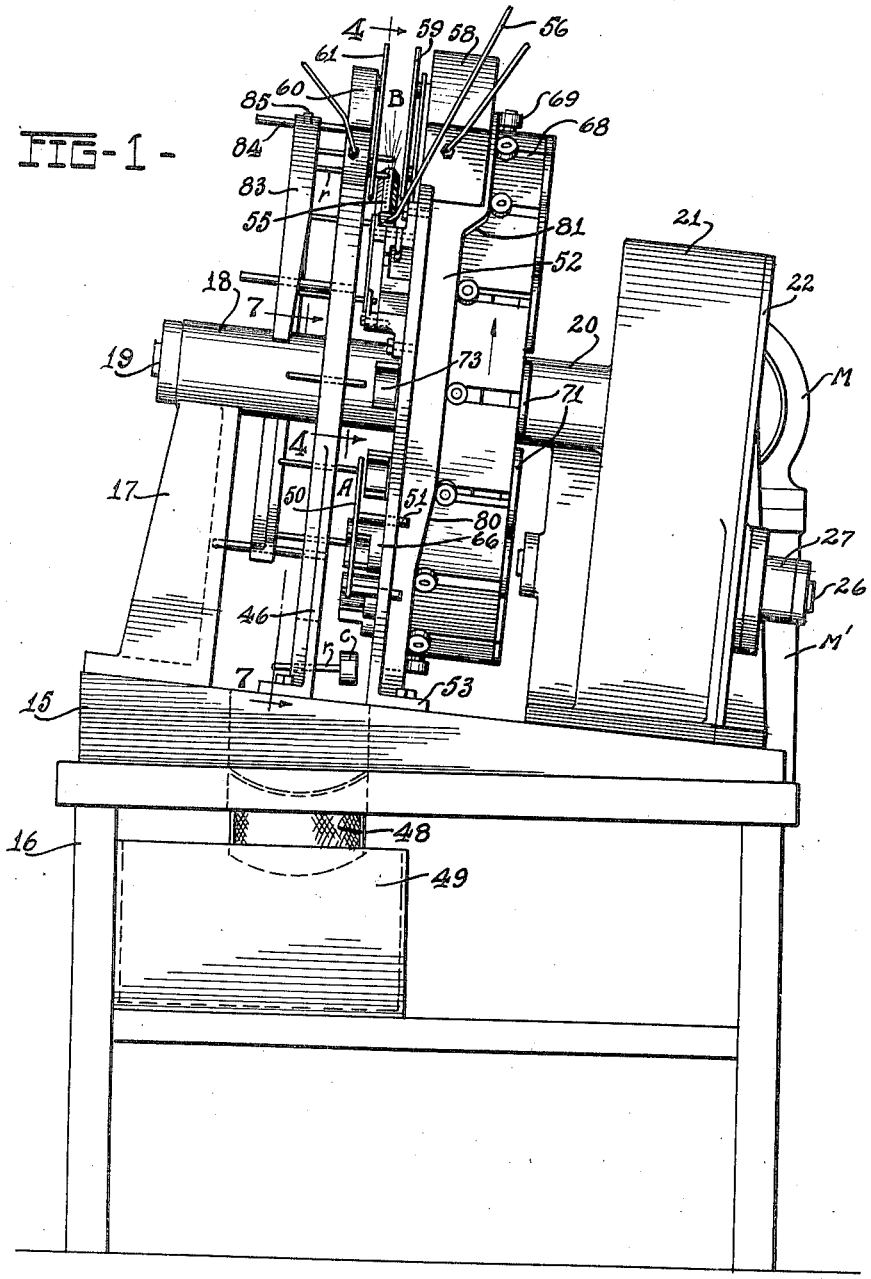

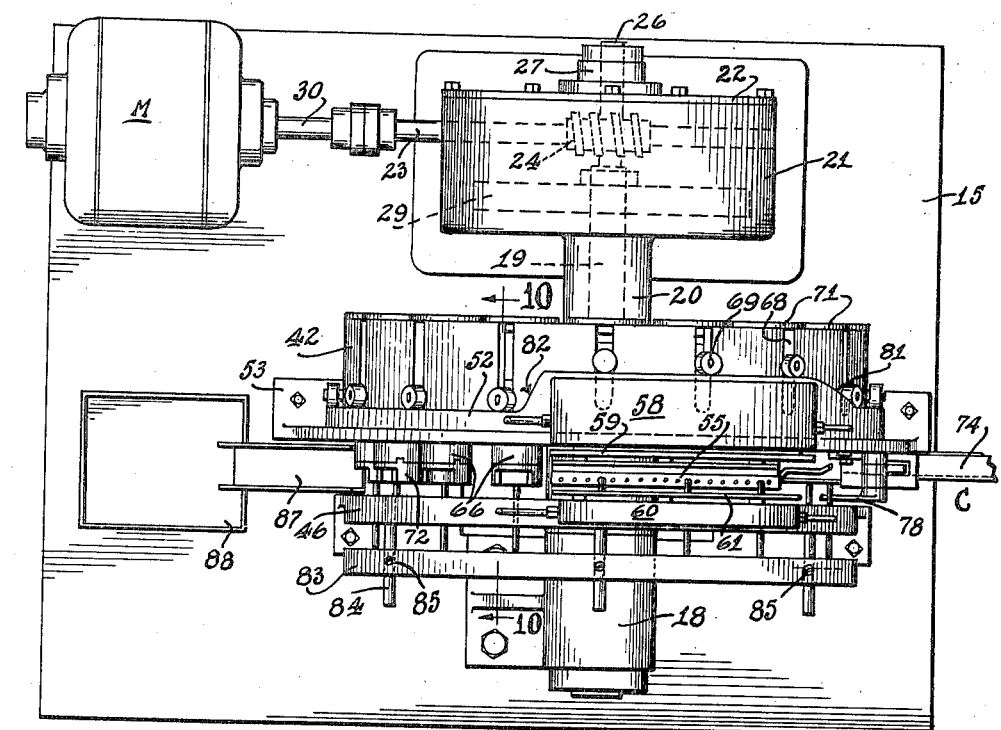

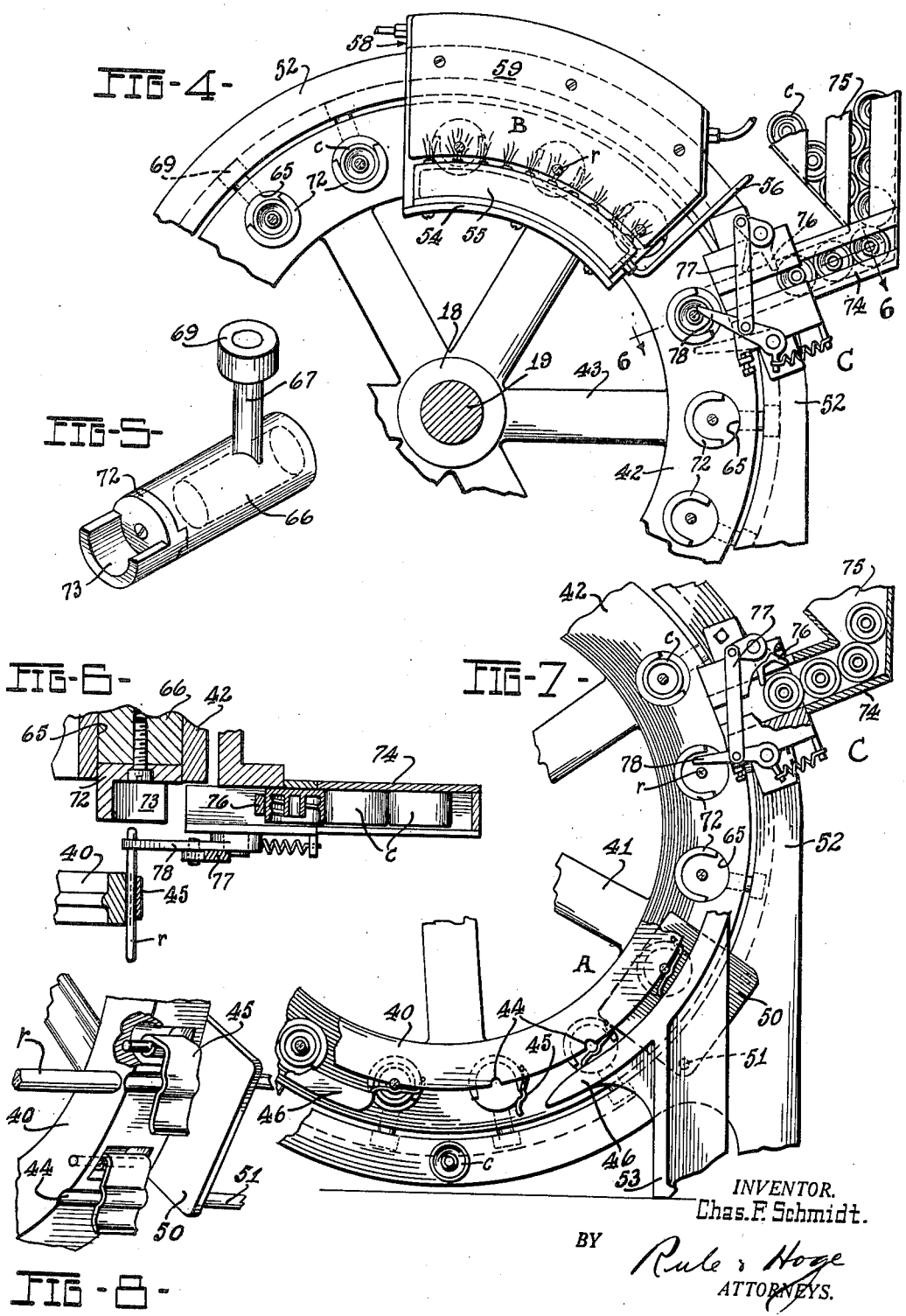

Patented Jan. 2, 1940

2,185,271

UNITED STATES PATENT OFFICE 2,185,271

APPARATUS FOR ASSEMBLING GLASS APPLICATOR RODS AND BOTTLE CAPS

Charles F. Schmidt, Toledo, Ohio, assignor to Owens-Illinois Glass Company, a corporation of Ohio Application August 18, 1937, Serial No. 159,726

22 Claims. (Cl. 49—1)

The present invention relates to an apparatus for applying glass rods to bottle closures in the manufacture of applicator closures for pharmaceutical bottles of the type adapted to contain iodine, mercurochrome and other antiseptic solutions designed for external application.

The invention is designed as an improvement over the apparatus disclosed in my copending application Serial No. 108,694, filed November 2, 1936, for Apparatus for assembling glass applicator rods and bottle caps, and has for its principal object to provide a machine which is fully automatic in its operation and which will receive the rods and the closures separately and operate to move the rods successively through a heating zone in which one end of each rod becomes heated and assumes a plastic condition prior to being brought into alignment with a molded closure whereupon a plunger mechanism forces the closure into engagement with the heated end of the rod in such a manner that the heated end of the rod enters a recess provided in the closure and effects enlargement of the heated end to cause permanent union between the rod and closure.

Another object of the invention is to provide such an apparatus in which the rods are individually fed to the machine and in which the closures therefor are automatically fed to the machine in timed relation to the feeding of the rods in such a manner that should for any reason whatsoever a rod fail to be supplied for any particular closure, that closure will be withheld from introduction into the machine and will await such time as a rod is supplied to the machine for union therewith.

Another object of the invention is to provide an apparatus embodying the general principles disclosed in my above mentioned copending application in which there is incorporated a continuously rotating carrier that operates to receive the rods and closures therefor in accurate alignment and which maintains such alignment of the rods and closures throughout the entire path of movement of the same in the machine.

Another object of the invention is to provide such an apparatus in which the inner ends of the glass rods are successively passed through a zone of intense heat in alignment with the closures therefor, means being provided for shielding the closures from the damaging action of the heat generated in the heating zone.

Other objects of the invention will become apparent hereinafter.

In the accompanying drawings:

Fig. 1 is a side elevational view of a machine manufactured in accordance with the principles of the present invention;

Fig. 2 is a top plan view thereof;

Fig. 3 is a front elevational view thereof;

Fig. 4 is an enlarged sectional elevational view taken substantially along the line 4—4 of Fig. 1;

Fig. 5 is an enlarged perspective view of a cap receiving plunger employed in connection with the present invention;

Fig. 6 is a sectional view taken substantially along the line 6—6 of Fig. 4;

Fig. 7 is enlarged sectional view taken substantially along the line 7—7 of Fig. 1;

Fig. 8 is an enlarged fragmentary perspective view of a portion of the peripheral region of a rotary rod carrier employed in connection with the present invention and illustrating the manner in which the rods are introduced into the machine and supported therein;

Fig. 9 is a fragmentary sectional view taken substantially along the line 9—9 of Fig. 3;

Fig. 10 is a sectional view taken substantially along the line 10—10 of Fig. 2;

Fig. 11 is a side elevational view, partly in section, of one form of applicator rod showing a cap applied thereto; and Fig. 12 is an enlarged fragmentary sectional view taken centrally through an applicator cap showing a rod applied thereto and illustrating the manner in which the end of the rod becomes swaged or enlarged within the recess provided for it in the cap.

Referring to Fig. 11 wherein an assembled applicator closure is shown in detail, an applicator rod is designated at $r$ while the cap to which the rod is applied is designated at $c$. The outer end of the rod $r$ is slightly enlarged to facilitate application of an antiseptic solution to the skin of the user. The apparatus comprising the present invention is, according to the method thereof, designed to continuously and automatically assemble the rods $r$ and closures $c$ by successively aligning the rods $r$ fed to the machine with recesses 13 formed in the caps $c$, conveying the rods past a heating zone to heat the inner ends thereof, and by moving the caps axially toward the heated ends of the rods to cause the ends to enter the recesses 13. The semi-plastic heated ends of the rods, upon engaging the end of the recess 13, become enlarged or swaged to firmly maintain these ends permanently secured in the recesses as illustrated at 14 in Fig. 12.

Referring now to Fig. 1, the apparatus proper is mounted upon a base plate 15 which is in turn mounted upon a table 16. The upper surface of the base plate 15 is inclined with respect to the horizontal table surface and has bolted adjacent the forward edge thereof a standard 17 (Figs. 1, 3 and 9). A bearing 18, formed on the upper end of the standard 17, serves to support one end of a horizontal shaft 19, the other end of which is supported in a bearing 20 formed on a substantially cylindrical gear casing 21 (Figs. 1, 2 and 9) which is bolted to the base plate 15 adjacent the rear edge thereof. The rear end of the gear casing 21 is closed by a substantially circular plate 22 which is also bolted to the base plate 15. A motor shaft extension 23 (Figs. 2 and 9) extends through the casing 21 and is provided with a worm 24 (Fig. 9) in the central region thereof which meshes with a comparatively large worm gear 25 mounted on a jack shaft 26. The shaft 26 is supported in bearings 27 formed on the casing 21 and cover plate 22. A spur gear 28, mounted on the shaft 26 within the casing 21, meshes with a driivng gear 29 which is mounted on the rear end of the shaft 19. A motor M and its standard M' (Figs. 2 and 3), positioned on and secured to the base plate 15 adjacent one forward corner thereof, is provided with a motor shaft 30 which is coupled to the shaft extension 23. Thus it will be seen that the shaft 19 is continuously driven through the various gears contained within the casing 21 from the motor M.

The medial region of the shaft 19 is enlarged as at 35 (Fig. 10) and the central hub 36 of a rotary carrier 37 is keyed as at 38 thereto.

The rotary carrier 37 includes a ring-like conveyor 40 (Figs. 10 and 11) for the applicator rods r which is connected to the hub 36 by radial spokes 41 (also Fig. 3), and a ring-like conveyor 42 for the molded caps c which is also connected to the hub 36 by spokes 43.

Referring now to Fig. 3, the periphery of the ring-like rod conveyor 40 has formed therein a series of equally spaced rod supporting grooves 44. A plurality of relatively stiff but flexible retaining fingers 45 (also Fig. 8) are pivoted to the conveyor 40 adjacent the periphery thereof and each finger 45 overlies a groove 44 and yieldingly bears against the rod r contained therein to maintain the same in position within the groove. An arcuate pressure bar 46, having supports 47 bolted to the base plate 15, encircles a major portion of the rod conveyor 40, is concentric therewith and is slightly spaced therefrom. The free ends of the retaining fingers 45 are adapted to bear against the inside of the pressure bar 46 as the fingers enter the space existing between the pressure bar and the periphery of the conveyor 40. Thus the fingers 45 are urged into rod retaining position throughout a major portion of each revolution of the carrier 37. The pressure bar 46 is discontinued in the lower regions thereof in order that the fingers 45 may swing outwardly from the conveyor 40 by the action of gravity to release the rods r to which caps c have been applied. A chute 48 is disposed centrally beneath the carrier 37 to receive the discharged assembled applicator closures and deposit the same in a receptacle 49 positioned beneath the table 16.

Referring now to Figs. 3, 7 and 8, the rods r are placed in the grooves 44 at a feeding zone A shortly after the respective retaining fingers 45 therefor enter the space existing between the pressure bar 46 and the periphery of the conveyor 40. An abutment plate 50 is secured by means of supporting rods 51 to a stationary part of the apparatus and occupies a position immediately behind the conveyor 40. The operator is positioned in front of the apparatus and feeds the rods one at a time successively into the grooves 44 in such a manner that the inner end of each rod comes into engagement with the plate 50. Inasmuch as the outer ends of the applicator rods r are slightly enlarged to facilitate application of the antiseptic solution, it is essential that in placing the unattached rods in the grooves 44, the unenlarged ends thereof to be heated be directed into the grooves. The position of the plate 50 determines the lateral spacing of the inner ends of the rods r from the conveyor 42.

Referring now to Figs. 4, 7 and 9, a circular cam track 52, having supports 53 bolted to the base plate 15, encircles the ring-like conveyor 42, is concentric therewith, and is slightly spaced therefrom. Suspended from the upper region of the cam track 52 by means of a plate 54 and occupying a position between the two conveyors 40 and 42, is a burner 55, the upper surface of which is of arcuate form and is provided with a series of burner openings therein. One end of the burner 55 communicates with a conduit 56 by means of which it is supplied with a suitable combustible gas. Apertures 57 provided in the supporting plate 54 permit the entry of air to the burner region between the conveyors 40 and 42. The upper curved surface of the burner occupies a position inwardly of the periphery of the conveyor 40 in order that the inner ends of the rods r may successively pass over the flame generated by the burner as the conveyor rotates. Thus a zone B of relatively high heat is provided by the burner through which the inner ends of the rods r pass and in which zone these ends of the rods are brought to a semi-plastic condition prior to being contacted by the caps c which are carried by the conveyor 42. In order to assimilate a major portion of the intense heat generated by the burner 55 and thus protect the molded bottle caps c and surrounding parts of the apparatus, a water jacket 58 (Figs. 1, 4 and 9) is welded or otherwise secured to the cam track 52 in the upper regions thereof. A flame guard 59 or deflector plate which is secured to the cam track 52 extends downwardly to a region below the burner 55, between the same and the rim of the conveyor 42. Similarly, a water jacket 60 and flame guard 61 or deflector plate are mounted on the periphery of the pressure bar 46.

The ring-like conveyor 42 is provided with a series of radially spaced cylindrical bores 65 or cylinders (Figs. 4 and 9) which correspond in number to the number of rod retaining grooves 44 and which are respectively and permanently aligned therewith. Each cylinder 65 has slidably mounted therein a cap retaining plunger 66 of substantial cylindrical formation. An arm 67, integrally formed on each plunger 66, projects through a slot 68 formed in the wall of the cylinder 65. A cam roller 69 mounted on the arm 67 exteriorly of the cylinder 65 bears against the cam track 52, previously mentioned. Each plunger 66 is normally urged forwardly in the cylinder and is projected therefrom by means of a coil spring 70 which is disposed within the cylinder and bears against a closure plate 71 (Fig. 1) for the cylinder. Engagement of the various cam rollers 69 with the circular cam track 52 causes the plungers 66 to be partially or fully retracted into the cylinder against the action of the coil springs 70 in a manner that will subsequently be set forth.

A cap retaining element 72 (Fig. 5) is removably secured to each plunger 66 at the forward end thereof and is provided with an arcuate cap support 73 which faces outwardly toward the periphery of the conveyor 42. The cap retaining elements 72 may be constructed with cap supports 73 the curvature of which varies, and thus caps of varying diameters may be accommodated in the apparatus merely by performing the necessary substitutions.

The caps c are fed into the machine at a cap receiving zone C by way of a chute 74 (Fig. 4) which receives the caps from a hopper 75 properly oriented for introduction into the machine. The lower end of the chute 74 is secured to the stationary cam track 52 and has associated therewith a cap dispensing mechanism by means of which the caps are individually and automatically fed to the machine in timed relation to the passage of the rods past a given point.

The cap dispensing mechanism just referred to consists of a cap selector or latch 76 which is connected by a link 77 to a rod engaging finger 78 which projects into the path of movement of the inner ends of the rods r between the conveyors 40 and 42. As the conveyors rotate in unison, the cap retaining elements 66 are successively moved past the lowermost end of the chute 74 and in so passing momentarily come into register therewith. Each rod r engages the finger 78 immediately prior to coming into register with the chute 74 in such a manner that the latch 76 releases a cap which falls by gravity into the cap retaining element 66 in alignment with the rod precisely at the moment when the cap retaining element comes into register with the lower end of the chute 74. If, for any reason whatsoever, a rod fails to be supplied to a particular groove 44, the cap dispensing mechanism will fail to be actuated and thus no cap will be supplied to the retaining member 66 for the missing rod.

Referring now to Figs 1, 2 and 3, the cam track 52 is so designed that the plungers 66 and cap supports 73 will clear the abutment plate 50 by virtue of a gradual incline 80 and move into the cap receiving zone C with the plungers partially extended from their respective cylinders 65 in such a manner that the cap supports will, in passing, come into register with the lower end of the chute 74 to receive caps therefrom. Each cap is deposited in the cap support 73 and the recess 14 therein is accurately aligned with the inner end of a rod r contained in the corresponding groove 44. This alignment of the cap and rod is maintained throughout the remainder of the existence of the cap and rod in the machine.

As the caps and rods approach the heating zone B a relatively sharp incline 81 (Fig. 1) formed on the cam track 52 causes the plungers 66 to be fully retracted into the cylinder 65 in order that the contained caps may clear the burner supporting plate 54 (Fig. 9) and pass behind the same and be shielded by both the plate 54 and the heat deflector plate 59.

After the ends of the rods r are heated by passing through the heating zone B, a sharp incline 82 in the cam track 52 permits the plungers 66 to be fully extended from the cylinders 65 as shown in Fig. 10 in such a manner that the heated ends of the rods enter the recesses 13 provided for them in the caps c. In order to brace the outer ends of the rods r and prevent lateral shifting of the rods in the grooves 44, a stationary arcuate thrust bar 83 is adjustably supported in spaced relation from the arcuate pressure bar 46 by means of spacing rods 84. Set screws 85 permit adjustment of the thrust bar toward and away from the pressure bar 46. Upon contacting the bottoms of the recesses 14, the heated ends of the rods r become enlarged or swaged as illustrated in Fig. 12 and are thus firmly and permanently maintained in the recesses.

Heretofore in assembling the caps on the heated ends of the applicator rods, considerable difficulty has been encountered due to generation of gases within the recesses provided in the molded composition caps. Such gases being entrapped within the walls of the recesses and the ends of the heated rods tend to literally blow the cap from the rod. In the present instance, the nature of the cam track 52 is such that the plungers 66 remain extended and the caps c remain yieldingly pressed against the heated ends of the rods r from the time of their initial contact until the assembled articles are discharged from the machine at the bottom of the carrier 37.

Referring now to Figs. 2 and 3, it will be seen that as the individual cap supports 73 move downwardly beyond the horizontal plane of the axis of the carrier 37, these supports become tilted and would ordinarily discharge the caps contained therein were it not for the fact that the caps are supported by the rods upon which they are assembled. Thus, should for any reason a rod become broken during its passage through the machine, or should a rod initially be too short, the cap designed for union therewith will fall by gravity from the conveyor 42 into a chute 87 from whence it is deposited in a receptacle 88 from which it may, with any other caps similarly deposited, be reclaimed.

As previously stated, the arcuate pressure bar 46 is discontinued in the region of the bottom of the carrier 37, and thus the resilient retaining fingers 45 move out of contact with the end of the pressure bar as they approach their lowermost position to release the assembled articles into the chute 47. Any fragments of broken rods that may remain in the grooves 44 as well as any short rods that may have been introduced into the machine will likewise be released by the fingers 45 into the chute 47.

Modifications and variations may be resorted to within the spirit and scope of the present invention as defined in the appended claims.

I claim:

1. A machine for applying applicator rods to recessed molded bottle caps comprising a rotary carrier, means on said carrier for supporting an applicator rod and a recessed bottle cap with one end of said rod in permanent alignment with the recess provided in said cap, stationary means for producing a flame, means for rotating said carrier relative to said flame to move said end of the rod through said flame to heat the same, and means for establishing relative axial movement between said aligned heated end and cap so as to cause said heated end to enter said recess and effect permanent union of said rod and cap.

2. A machine for applying applicator rods to recessed molded bottle caps comprising a rotary carrier, means on said carrier for supporting an applicator rod and a recessed bottle cap with one end of said rod in permanent alignment with the recess provided in said cap, means for producing a stationary flame, means for rotating said carrier relative to said flame to move said end of the rod through said flame to heat the same, means for moving said cap toward said aligned heated end so as to cause the latter to enter said recess and effect permanent union of said rod and cap, and means for preventing axial shifting of said rod.

3. A machine for applying applicator rods to recessed molded bottle caps comprising a rotary carrier, means on said carrier for supporting an applicator rod and a recessed bottle cap with one end of said rod in permanent alignment with the recess provided in said cap, means for producing a flame, means for rotating said carrier to move said end of the rod through said flame to heat the same, spring means for moving said cap toward said aligned end so as to cause the latter to enter said recess and yieldingly bear against the bottom thereof, and means for preventing axial shifting of said rod.

4. A machine for applying applicator rods to recessed molded bottle caps comprising a rotary carrier, means on said carrier for supporting an applicator rod and a recessed bottle cap with one end of said rod in permanent alignment with the recess provided in said cap, means for producing a stationary flame, means for rotating said carrier to move said end of the rod through said flame to heat the same, means for shielding said cap from the heat of said flame, and means for establishing relative axial movement between said aligned heated end and cap so as to cause said heated end to enter said recess and effect permanent union of said rod and cap.

5. A machine for applying applicator rods to recessed molded bottle caps comprising heating means providing a zone of relatively high heat, means for supporting a plurality of applicator rods and recessed caps with an end of each rod in permanent alignment with the recess provided in a respective cap, means for moving said supporting means to convey the rods successively past said zone to heat an end of each rod, and means for successively establishing relative axial movement between the heated ends of the rods and their respective caps to effect permanent union of said rods and caps.

6. A machine for applying applicator rods to recessed molded bottle caps comprising heating means providing a zone of relatively high heat, means for supporting a plurality of applicator rods and recessed caps with an end of each rod in permanent alignment with the recess provided in a respective cap, means for moving said supporting means to convey the rods successively past said zone to heat an end of each rod, means for successively moving said caps toward the heated ends of respective rods to effect permanent union of said rods and caps, and means for preventing axial shifting of said rods.

7. A machine for applying applicator rods to recessed molded bottle caps comprising heating means providing a zone of relatively high heat, means for supporting a plurality of applicator rods and recessed caps with an end of each rod in permanent alignment with the recess provided in a respective cap, means for moving said supporting means to convey the rods successively past said zone to heat an end of each rod, spring means for successively moving said caps toward the heated ends of respective rods to cause said heated ends to enter the recesses provided in said caps and yieldingly bear against the bottom thereof, and means for preventing axial shifting of said rods.

8. A machine for assembling applicator rods and molded bottle caps each having a central recess formed therein for reception of a rod comprising a rod conveyor and a cap conveyor for supporting respective series of the articles in paired axial alignment, means for producing a flame, means for rotating said conveyors in unison to cause corresponding ends of said rods to pass through said flame and be rendered plastic, means for successively moving the articles of one series toward the articles of the other series with which they are in alignment to cause said heated ends of the rods to enter the recesses provided for them in respective caps, and means for preventing axial shifting of the articles of said other series.

9. A machine for assembling applicator rods and molded bottle caps each having a central recess formed therein for reception of a rod comprising a rod conveyor and a cap conveyor for supporting respective series of the articles in paired axial alignment, means for producing a flame, means for rotating said conveyors in unison to cause corresponding ends of said rods to pass through said flame and be rendered plastic, cam controlled spring means for successively moving the articles of one series toward the articles of the other series with which they are in alignment to cause said heated ends of the rods to enter the recesses provided for them in respective caps, and means for preventing axial shifting of the articles of said other series.

10. A machine for applying applicator rods to molded bottle caps having recesses formed centrally and axially therein comprising a rotary carrier including a rod conveyor and a cap conveyor, means on said rod conveyor for supporting a plurality of rods in spaced relationship, movable cap supports on said cap conveyor for supporting a plurality of caps in axial alignment with an end of respective rods on said rod conveyor, means for producing a flame, means for rotating said carrier to move the ends of the rods through said flame to heat the same, means for moving said cap supports toward said rods to cause said heated ends thereof to enter said recesses, and means for holding the rods on said rod conveyor against axial shifting.

11. A machine for applying applicator rods to molded bottle caps having recesses formed centrally and axially therein comprising a rotary carrier including a rod conveyor and a cap conveyor, means on said rod conveyor for supporting a plurality of rods in spaced relationship, movable cap supports on said cap conveyor for supporting a plurality of caps in axial alignment with an end of respective rods on said rod conveyor, means for producing a flame, means for rotating said carrier to move the ends of the rods through said flame to heat the same, means operable upon movement of said ends toward the flame for moving respective cap supports away from said rods, means operable after said ends have passed through the flame for moving the respective cap supports toward said rods and cause the heated ends thereof to enter the recesses of said caps, and means for holding the rods against axial shifting.

12. A machine for applying applicator rods to molded bottle caps having recesses formed centrally and axially therein comprising a rotary carrier including a rod conveyor and a cap conveyor, means on said rod conveyor for supporting a plurality of rods in spaced relationship, movable cap supports on said cap conveyor for supporting a plurality of caps in axial alignment with an end of respective rods on said rod conveyor, means for producing a flame, means for rotating said carrier to move the ends of the rods through said flame to heat the same, means for preventing axial shifting of said rods on said conveyor, and cam controlled spring means for moving said cap supports toward said rods to cause the heated ends thereof to enter said recesses.

13. A machine for applying applicator rods to molded bottle caps provided with centrally formed recesses therein comprising a carrier mounted for rotation about a substantially horizontal axis and including a cap conveyor and a rod conveyor movable with the carrier, means for rotating said carrier continuously, means on said rod conveyor for supporting a plurality of rods in parallelism with the axis of said carrier, a stationary thrust bar against which an end of each rod is adapted to bear upon rotation of said carrier, means on said cap conveyor for supporting a plurality of caps with the recesses therein in axial alignment with respective rods on said rod conveyor, and means operable upon rotation of said carrier for successively moving said caps toward the rods.

14. In a machine for applying applicator rods to molded bottle caps provided with centrally formed recesses therein, a carrier mounted for rotation about a substantially horizontal axis and including a cap conveyor and a rod conveyor movable with the carrier and occupying fixed positions thereon relative to each other, means for rotating said carrier continuously, means on said rod conveyor for supporting a plurality of rods in parallelism with the axis of said carrier, means for preventing axial shifting of said rods, means on said cap conveyor for supporting a plurality of caps with the recesses therein in axial alignment with respective rods on said rod conveyor, and means operable upon rotation of said carrier for successively moving the caps toward said rods.

15. In a machine for applying bottle caps having recesses formed centrally therein to applicator rods, a rotatable carrier including a ring-like rod conveyor having parallelwise extending peripheral recesses formed therein for reception of the rods and a cap conveyor having cap supports for maintaining the caps introduced thereto in axial alignment with respective rods in said grooves, means for rotating said carrier, a chute adapted to contain caps for introduction by gravity to said cap supports, a trip mechanism for releasing the caps in said chute for delivery to successive cap supports, and tiltable means positioned in the path of movement of said rods and adapted to be successively tilted by contact with the rods in said grooves for actuating said trip mechanism.

16. A machine for applying applicator rods to molded bottle caps having central recesses formed therein comprising a pair of spaced conveyors including a ring-like rod conveyor and a ring-like cap conveyor rotatable in unison about a horizontal axis, means for rotating said conveyors, means on the periphery of said rod conveyor for frictionally supporting a plurality of rods in spaced relationship, means on said cap conveyor for supporting a plurality of caps in axial alignment with said rods, heating means providing a zone of relatively high heat between said conveyors through which corresponding ends of said rods successively pass to become heated, and means operable upon rotation of said conveyors for moving said caps successively toward the heated ends of respective rods to cause union between said caps and rods.

17. In a machine for applying bottle caps having recesses formed centrally therein to applicator rods, a rotatable carrier including a ring-like conveyor having parallelwise extending grooves formed in the periphery thereof for reception of the rods and a cap conveyor having movable cap supports therein for maintaining caps introduced thereto in axial alignment with respective rods in said grooves, means for rotating said carrier, means operable upon rotation of said carrier for successively moving said cap supports toward respective rods in said grooves, a finger pivoted to said rod conveyor in the vicinity of each groove and adapted to bear against the rod therein to frictionally maintain the same in said groove, and a pressure bar positioned in the path of movement of said fingers for forcing the same against said rods.

18. A machine for assembling applicator rods and molded bottle caps having centrally formed recesses therein for reception of the rods comprising a rod conveyor and a cap conveyor, means on said rod conveyor for supporting a plurality of rods in spaced relationship, means on said cap conveyor for supporting a plurality of caps in axial alignment with an end of respective rods on said rod conveyor, heating means providing a zone of relatively high heat for heating corresponding ends of said rods, means for rotating said conveyors in unison to move said rod supporting means successively past a rod receiving zone wherein the rods are manually introduced to said rod supporting means, past a cap receiving zone, through said zone of relatively high heat, through an assembly zone to a discharging zone, and to move said cap supporting means past the cap receiving zone through said assembly zone to said discharging zone, means at said cap receiving zone for introducing caps to said cap supporting means in timed relation to the movement of the rods past said rod receiving zone, means at said assembly zone for moving the rods and caps relative to each other axially to cause the heated ends of the rods to enter the recesses provided for them in respective caps, and means at said discharging zone for rendering said rod supporting means inoperative to discharge the assembled rods and caps from the machine by gravity.

19. A machine for assembling glass applicator rods and molded caps wherein the latter each have a well or recess to receive one end of a rod, said machine comprising an annular series of cap holders, an annular series of respectively aligned rod hoders, a shaft rotatably supporting both series of holders in close spaced relationship with the rod holders in permanent alignment with the cap holders, means for rotating the holders in unison and thereby moving aligned pairs thereof successively through cap and rod receiving positions, a rod heating zone, a cap and rod assembling zone and a discharging zone, stationary means in the rod heating zone for producing a flame in the path of movement of said rod ends, means in said assembling zone for effecting relative axial movement between the cap and rod to thereby project one end of a rod into a cap recess, means for holding the cap and rod against relative axial movement immediately following the assembling operation, and means employing the force of gravity for removing assembled rods and caps from the machine.

20. A machine for applying applicator rods to recessed bottle caps comprising a rotary carrier, means on said carrier and movable therewith for supporting a plurality of applicator rods with their axes parallel to the axis of the carrier, means on said carrier and movable therewith for supporting a plurality of recessed caps with the recesses thereof in axial alignment with respective rods, stationary means for producing a flame, means for rotating the carrier to move said rods and caps in unison and cause the ends of the former to pass through said flame, a flame guard in the vicinity of said flame and disposed between the respective paths of movement of the rods and caps, means operable upon rotation of the carrier for moving the caps successively toward respective rods after the latter have passed through said flame, and means for preventing axial shifting of the rods.

21. A machine for applying applicator rods to recessed bottle caps comprising a rotary rod conveyor, a rotary cap conveyor, means on the rod conveyor for supporting a series of rods in spaced relationship with their axes in parallelism, means on the cap conveyor for supporting a series of caps with the recesses thereof in axial alignment with respective rods on the rod conveyor, stationary flame producing means, means for rotating said conveyors in unison to move corresponding ends of said rods through said flame, and means for establishing relative axial movement between the heated ends of the rods and respective caps to cause said heated ends to enter the recesses provided for them in said caps.

22. A machine for applying applicator rods to recessed bottle caps comprising a rotary rod conveyor, a rotary cap conveyor, means on the rod conveyor for supporting a series of rods in spaced relationship with their axes in parallelism, means on the cap conveyor for supporting a series of caps with the recesses thereof in axial alignment with respective rods on the rod conveyor, stationary flame producing means, means for rotating said conveyors in unison to move corresponding ends of said rods through said flame, and means for moving said caps toward the heated ends of the rods to effect permanent union of said rods and caps.

CHARLES F. SCHMIDT.